United States Patent
Yadav et al.

(10) Patent No.: US 8,320,567 B2
(45) Date of Patent: Nov. 27, 2012

(54) EFFICIENT DATA PATH ENCAPSULATION BETWEEN ACCESS POINT AND ACCESS SWITCH

(75) Inventors: Navindra Yadav, San Jose, CA (US); Sheausong Yang, Saratoga, CA (US); Senthil Arunachalam, Fremont, CA (US); Bhanu Gopalasetty, San Jose, CA (US); Gnanaprakasam Pandian, Cupertino, CA (US); Hiroshi Suzuki, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 1304 days.

(21) Appl. No.: 11/650,082

(22) Filed: Jan. 5, 2007

(65) Prior Publication Data

US 2008/0165968 A1 Jul. 10, 2008

(51) Int. Cl.
*H04K 1/00* (2006.01)
(52) U.S. Cl. .......................... 380/270; 380/271; 380/272
(58) Field of Classification Search .................. 380/270, 380/255, 247; 713/150, 100, 182, 188, 189; 726/26, 27, 28, 29, 30
See application file for complete search history.

(56) References Cited

U.S. PATENT DOCUMENTS

| | | | |
|---|---|---|---|
| 7,028,186 B1 | 4/2006 | Stenman et al. | |
| 7,039,021 B1 | 5/2006 | Kokudo | |
| 2002/0164029 A1* | 11/2002 | Jiang | 380/270 |
| 2006/0014522 A1* | 1/2006 | Krischer et al. | 455/410 |
| 2007/0064673 A1* | 3/2007 | Bhandaru et al. | 370/351 |
| 2007/0160213 A1* | 7/2007 | Un et al. | 380/270 |
| 2007/0206796 A1* | 9/2007 | Iino et al. | 380/270 |

* cited by examiner

*Primary Examiner* — Brandon Hoffman
*Assistant Examiner* — Nega Woldemariam
(74) *Attorney, Agent, or Firm* — Cindy Kaplan

(57) ABSTRACT

In one embodiment, a method for processing encrypted wireless station data at a network device includes receiving from an access point, one or more frames comprising wireless station data fragmented into a plurality of encrypted protocol data units. The frames are configured to identify the encrypted protocol units associated with the wireless station data. The method further includes decrypting the encrypted protocol data units and forwarding the wireless station data. An apparatus for processing encrypted wireless station data, a method for transmitting encrypted multicast data for a wireless client, and a method for processing encrypted wireless station data at an access point are also disclosed.

16 Claims, 5 Drawing Sheets

US 8,320,567 B2

EFFICIENT DATA PATH ENCAPSULATION BETWEEN ACCESS POINT AND ACCESS SWITCH

BACKGROUND OF THE INVENTION

The present disclosure relates generally to data path encapsulation between an IEEE 802.11 Wireless LAN (WLAN) AP (Access Point) and an access switch.

Data received from an access point on a wired interface of a wireless aware switch or network device is typically encapsulated in accordance with a standards based protocol such as Lightweight Access Point Protocol (LWAPP) or Control And Provisioning of Wireless Access Points (CAPWAP). LWAPP/CAPWAP enables control and data frames to be exchanged between the AP and a wireless controller over any arbitrary underlying enterprise network. With conventional implementation, unicast IP packets are transmitted from a wireless station over a tunnel. The AP and the wireless controller share the tunnel and the original IP datagram packets are fragmented and encapsulated in Ethernet or other types of packets.

The security of a wireless LAN (Local Area Network) is very important. WEP (Wired Equivalent Privacy), WPA (Wi-Fi Protected Access), WPA2 (Wi-Fi Protected Access-2), etc are some of the optional encryption alternatives for IEEE 802.11 and related WLAN standard and are implemented in the MAC layer that most APs support. If a user activates WEP/WPA/WPA2, the payload of each 802.11 frame is encrypted before transmission to the AP. The AP performs decryption upon arrival of the frame. As a result, WEP, WPA, WPA2, etc only encrypts data between 802.11 stations (e.g., wireless client and AP). Once the frame enters the wired side of the network, such as between an access point and a switch, the wireless cryptographic protection no longer applies. Therefore, transfer of data from an AP to the switch is typically not secure and susceptible to message forgeries and other active attacks. In addition to the above drawbacks, performing cryptographic operations on the AP increases the cost, complexity, and power requirements of the AP. Managing per client keys and performing re-keying on the AP also adds to the client roaming time.

BRIEF DESCRIPTION OF THE DRAWINGS

Corresponding reference characters indicate corresponding parts throughout the several views of the drawings.

DESCRIPTION OF EXAMPLE EMBODIMENTS

Overview

In one embodiment, a method for processing encrypted wireless station data at a network device includes receiving from an access point, one or more frames of wireless station data comprising a plurality of encrypted protocol data units. The frames are configured to identify the encrypted protocol units associated with the wireless station data. The method further includes decrypting the encrypted protocol data units and forwarding the wireless station data. An apparatus for processing encrypted wireless station data, a method for transmitting encrypted multicast data for a wireless client, and a method for processing encrypted wireless station data at an access point are also disclosed.

Example Embodiments

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

Figure 1:
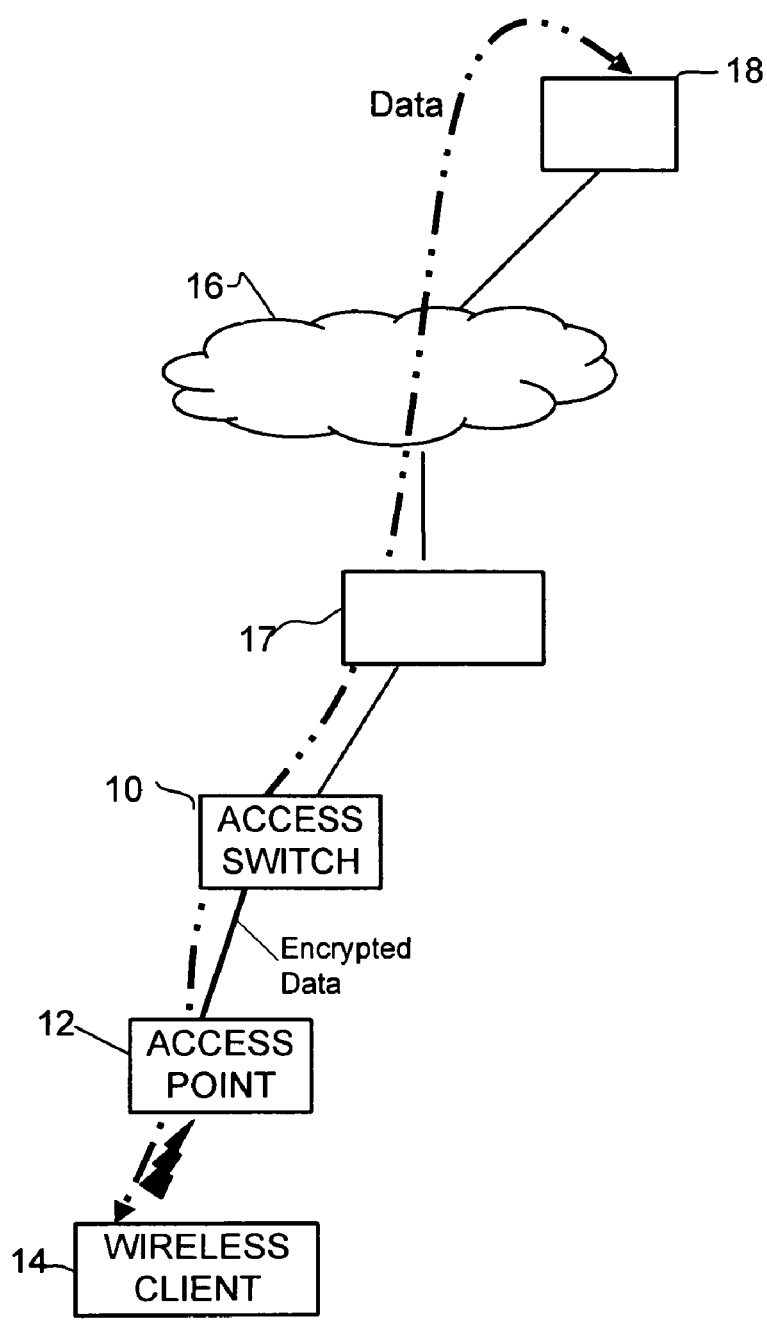
FIG. 1 illustrates an example of a network in which embodiments described herein may be implemented.

Referring now to the drawings, and first to FIG. 1, an example of a network that may implement embodiments described herein is shown. The embodiments operate in the context of a data communication network including multiple network elements. For simplification, only a small number of nodes are shown. Some of the nodes in a network that employs the embodiments may be network devices such as routers or switches. The network device may include, for example, a master central processing unit (CPU), interfaces, and a bus. The CPU preferably includes memory and a processor. The network device may be implemented on a general purpose network host machine such as a computer system or network device described below with respect to FIG. 5.

The simplified network shown in FIG. 1 comprises a switch (network device) 10 in communication with an AP (Access Point) 12 over a wired network, and a wireless station (client) 14 in communication with the AP over a wireless network. In one embodiment, the wireless client 14 communicates with the AP 12 in accordance with standard IEEE 802.11 and other related 802.11 standards for WLANs, and the switch 10 communicates with the AP in accordance with standard IEEE 802.3 for Ethernet. The wireless client 14 may be any mobile device, such as mobile phone, laptop computer, PDA (Personal Digital Assistant) or any other wireless device. The wireless client 14 is in communication with a network device (e.g., IP phone, user computer, server, or other device) 18 through a network 16 and various routers or switches 17. It is to be understood that the network shown in FIG. 1 is only one example and that networks having other devices and configurations may be used without departing from the scope of the invention. Also, protocols other than discussed herein may be used for communication within the wireless or wired network.

As described in detail below, the switch 10 is configured to provide encryption and decryption for mobile station traffic. Conventional systems utilize the access point to decrypt data received from a wireless client; however, as discussed above, this has many drawbacks including lack of security for data transfer between the AP 12 and switch 10. Besides a lack of security on the link between the AP and the access switch, putting the encryption and decryption burden on the AP leads to an increased cost, complexity and power requirements of the AP.

Embodiments described herein provide an interface for frame encapsulation for data between the access point 12 and switch 10. The encryption and decryption for mobile station traffic is offloaded to the switch 10. This eliminates the need for the switch 10 to synchronize keys for the wireless client 14 and allows for leveraging of an encryption engine typically contained in the switch to handle wire speed encryption and take care of per client or broadcast/multicast encryption. Another advantage of performing encryption at the switch 10 rather than the AP 12 is that the traffic between the switch and AP is encrypted. This is important since APs are not always located in secure locations. For example the APs may be physically located in unsecured public places such as parking lots, street lights/lamp posts, etc.

Figure 2:
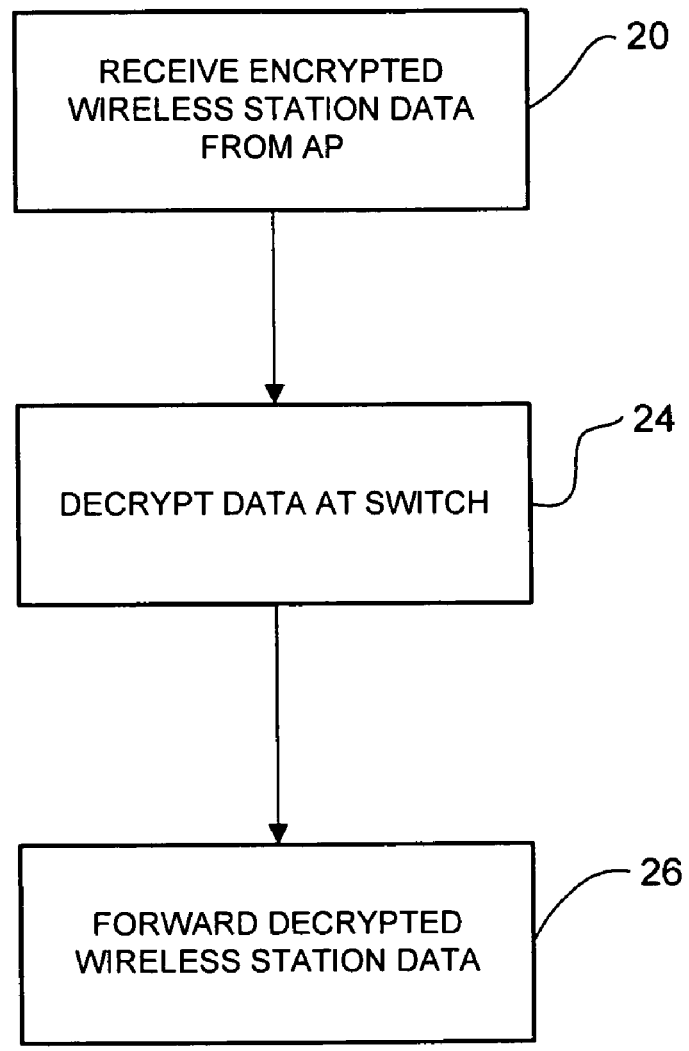
FIG. 2 is a flowchart illustrating an example of a method for processing wireless station data received from an access point.

FIG. 2 illustrates an overview of a process for receiving encrypted wireless station data at switch 10 from access point 12, in accordance with one embodiment. At step 20, one or more frames comprising encrypted wireless station data is received from the AP at the switch 10. Depending on the configured over the air RF, MTU size, the wireless station's data is fragmented into a plurality of encrypted protocol data units (PDUs). The frames are configured to identify the encrypted protocol data units associated with the wireless station data. For example, the related PDUs may be grouped together in one frame with an offset table that identifies the offset for each PDU, or the PDUs may be sent in individual frames in sequence with special frames marking the start and end of the sequence of wireless station data. The switch 10 decrypts the encrypted PDUs at step 24 and the PDUs are assembled to form decrypted wireless station data. The switch 10 may also remove headers and perform an integrity check of the data, as described below. The switch 10 then assembles the decrypted protocol data units into decrypted wireless station data and forwards the decrypted wireless station data to the wired network or back to the wireless domain (step 26).

Figure 3:
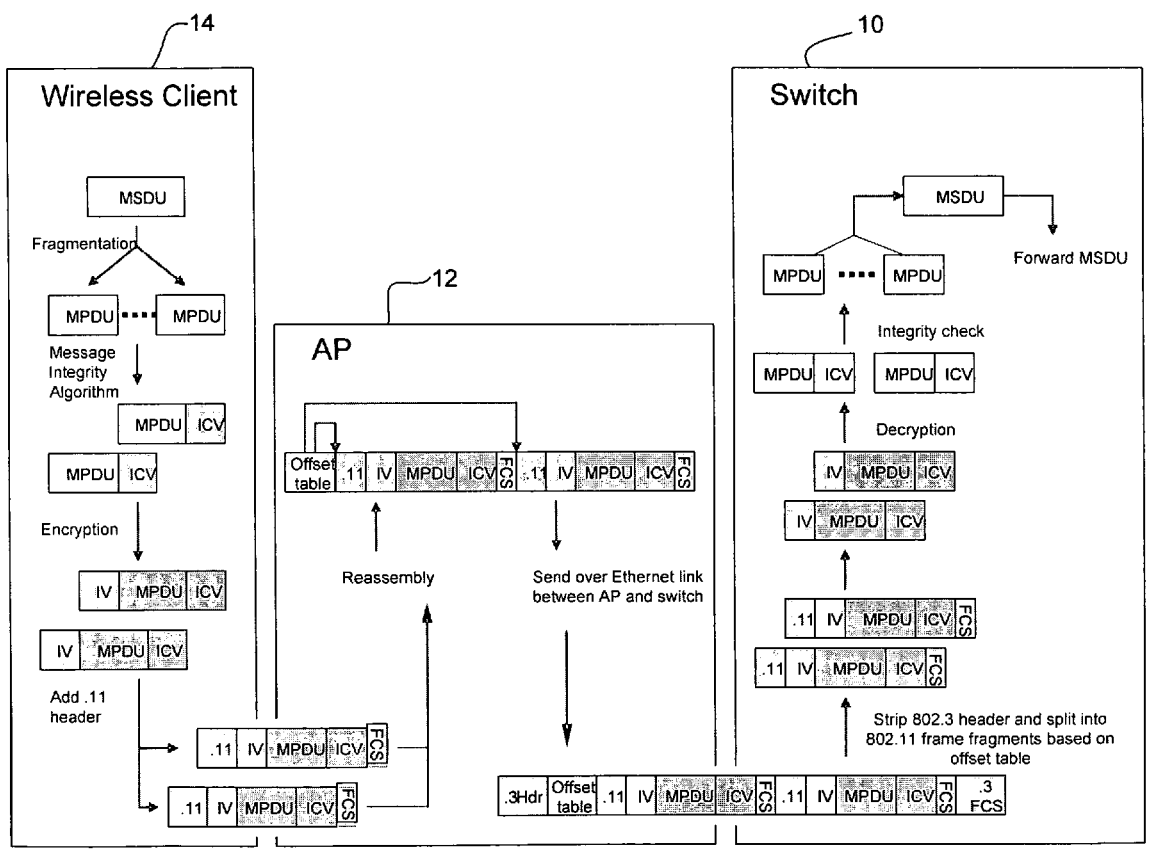
FIG. 3 illustrates transmission of unicast data from a wireless client to a switch according to one embodiment.

FIG. 3 illustrates details of the process shown in FIG. 2, in accordance with one embodiment. In this example, a unicast IP packet is transmitted from wireless client 14 to AP 12 and then to switch 10. The example shown in FIG. 3 and described below uses WEP (Wired Equivalent Privacy), however, it is to be understood that other protocols may also be used without departing from the scope of the invention. Also, the WLAN and Ethernet standard headers described below are only provided as examples.

An IEEE 802.11 MAC service data unit (MSDU) (wireless station data) is fragmented into MAC protocol data units (MPDUs) at the wireless client 14. The unencrypted data located in the frame body field of the MAC frame is run through an integrity algorithm that generates a four-octet integrity check value (ICV), which is sent with the data and checked at the receiving station (switch 10) to guard against unauthorized data modification. The WEP process inputs a secret shared encryption key into a pseudo-random number generator to create a key sequence with length equal to the plaintext and integrity check value. WEP encrypts the data by using bitwise XOR on the plaintext and integrity check value with the key sequence to create ciphertext. WEP prepares a seed by concatenating a shared secret key supplied by the wireless client with a random generated 24-bit initialization vector (IV). The standard IEEE 802.11 header is then added along with FCS (Frame Check Sequence) field and the data is transmitted to the AP 12.

The AP 12 does not perform any decryption or encryption. Also, the IEEE 802.11 header and ICV are maintained in the frame sent from the AP 12 to the switch 10. An IEEE 802.3 header is also added to the data before it is sent to the switch 10.

Reassembly (e.g., grouping the MPDUs with their associated MSDU) is preferably performed on the AP 12 to avoid the need to do per client buffering and reassembly at the switch 10. This is because maintaining per client queues on the switch 10 is expensive, in terms of memory. Therefore, it is preferred that the AP's memory and CPU power are used to do the reassembly.

The MSDU or MMPDU (MAC Management Protocol Data Unit) (wireless station data) is reconstructed by combining fragments in order of fragment number subfield of a Sequence Control field. If a fragment with a More Fragments bit set to zero has not yet been received, then the destination AP 12 knows that the MSDU or MMPDU is not complete. As soon as the AP 12 receives the fragment with the More Fragments bit set to zero, the AP knows that no more fragments will be received for the MSDU or MMPDU.

In one embodiment, the AP 12 maintains a Receive Timer for each MSDU or MMPDU being received, for a minimum of three MSDUs or MMPDUs. The AP 12 may implement additional timers so that it can receive additional concurrent MSDUs or MMPDUs. The receiving AP 12 preferably discards all fragments that are part of an MSDU or MMPDU for which a timer is not maintained. In one embodiment, there is also an attribute (aMaxReceiveLifetime) which specifies the maximum amount of time allowed to receive an MSDU. The receive MSDU or MMPDU timer starts upon reception of the first fragment of the MSDU or MMPDU. If the receive MSDU timer exceeds aMaxReceiveLifetime then all received fragments of this MSDU or MMPDU are discarded by the destination station. If additional fragments of a directed MSDU or MMPDU are received after its aMaxReceiveLifetime is exceeded, those fragments shall be acknowledged and discarded. In order to properly reassemble MPDUs into an MSDU or MMPDU, the AP 12 preferably discards any duplicated fragments it receives. An acknowledgement is preferably sent in response to a duplicate fragment of a directed MSDU.

The reassembly is performed on the AP 12 without the client keys. The MPDUs belonging to the same MSDU can be collated together, packed into a packet with a new header that contains pointers to the offsets in the collated packets where a complete 802.11 MPDU starts.

In one embodiment, an offset header contains an offset table specifying the offset for each frame fragment. The PDUs associated with the wireless station data (e.g., MSDU) are all grouped together in one concatenated frame and the offset header identifies the start of each PDU. The offset table header may be inserted after the Ethernet header and is configured as follows, in one example:

| Ver | Len | Off2 | Off3 | Off4 ... | Off16 | |
|-----|-----|------|------|----------|-------|---|
| 2   | 4   | 12   | 12   | 12       | 12    | ] → in bits |

Offsets are aligned to byte boundaries. The maximum Offset Table length is equal to 12*16+6 bits=about 25 bytes. The actual length of the Offset Table depends on the number of offsets. The length (Len) tells the number of Offsets in the table (e.g., if Len=0 then the MSDU is made up of a single fragment (one encrypted protocol data unit) and it starts right after the current byte). Each Offset field is 12 bits wide, which allows for 4095 bytes to be addressed. The above description is an example of the general principles, the above concept can be implemented using a number of different header formats or mechanisms.

In one embodiment, the use of the offset header can be avoided, if a restriction is placed on only connecting a single AP per switch port, or the switch port has the capability of holding fragmented packet from each AP on its own queue even if there are more than one APs connecting to the same switch port. For this embodiment, once the AP 12 has received all of the IEEE 802.11 encrypted MPDUs associated with the MSDU, the AP sends a special Ethernet frame to mark the start of a MSDU frame sequence, then the AP encapsulates each of the IEEE 802.11 MPDUs in individual Ethernet frames, sends them in sequence to the switch, and finishes it with another special Ethernet frame to mark the end of the MSDU frame. The start and end of MSDUs are sent to the switch 10 so that the switch can handle frame or CRC errors, and drop the entire sequence of frames it was receiving until it sees a new start of MSDU frame sequence frame.

The IEEE 802.11 fragment number field has four bits; this means in the worst case there can be 16 MPDUs in a MSDU (although this is unlikely). The maximum overhead would therefore include 16 times the number of 16 bit pointers, plus 16 IEEE 802.11 headers. If needed, the IEEE 802.11 headers can be compressed to include just the variable fields of MPDUs in a MSDU. The four addresses SA (source address), DA (destination address), RA (receiving address), and TA (transmitting address) do not need to be repeated for each of the following MPDUs.

Following encapsulation of the data frames at the AP 12, the encrypted data is sent over an Ethernet link between the switch 10 and AP 12. The IEEE 802.3 header is removed at the switch and the data is split into 802.11 frame fragments based on the offset table. The switch 10 recognizes the collated packet and breaks the packet into individual IEEE 802.11 encrypted MPDUs. The MPDUs are sent to the decryption engine. The WEP process deciphers the ciphertext using the shared key that generates the same key sequence used initially to encrypt the frame. The station calculates an integrity check value and ensures it matches the one sent with the frame. The output is collated to generate the MSDU and MIC (Message Integrity Code) (e.g., TKIP (Temporal Key Integrity Protocol) or CCMP (Counter Mode with Cipher Block Chaining Message Authentication Code Protocol)) or generate the individual plain text MPDUs with ICV. If the integrity check fails, the station will not hand off the MSDU, and a failure indication is sent to MAC management. If the ICV/MIC is verified, the reassembled MSDU (e.g., IPv4 or IPv6 packet) is parsed and a forwarding decision is made. The forwarding engine applies the wireless client's policies and depending on the destination may forward the packet to the wired network or back to the wireless domain.

In one embodiment, reassembly of the MPDUs is performed on the switch 10, because the AP 12 may be incapable of performing reassembly of the frames, for example. In this embodiment, all traffic from the AP 12 is punted through an exception path associated with the switch ASIC. The frames are reassembled and can then be fed back into the decryption engine. This exception path may be shared by all APs 12 connected to the switch 10 and can be built using an FPGA/NP/dedicated CPU core/virtualized CPU core, for example.

In one embodiment, the link between the AP 12 and switch 10 runs link by link encryption along with replay attack protection. This protects the IEEE 802.11 headers and other headers from snooping and active attacks. The keys for link by link encryption are independent of the keys that the wireless client 14 shares with the switch 10.

Link MTU (Maximum Transmission Unit) between the AP 12 and switch 10 is preferably boosted so as to avoid fragmentation of the frames. This is possible based on the assumption that the AP 12 is directly connected to the switch 10, and link MTU is in control of the switch.

The reverse path from the switch 10 to the AP 12 is similar to the forward path described above. However, in the path from the switch 10 to AP 12, the switch performs fragmentation of the MSDU into MPDUs for unicast frames depending on the value of a Fragmentation Threshold configuration setting. The switch 10 performs the MIC/ICV calculation and then encrypts the packet. The IEEE 802.11 header is appended to the encrypted MPDU. The switch 10 then collates the MPDUs and inserts the offset header and Ethernet header. The entire sequence is then sent from the switch 10 to the AP 12. The AP 12 uses the offset header to break the concatenated frame and obtain the IEEE 802.11 encrypted frames, which it sends over the wireless domain to the wireless client 14.

Figure 4:
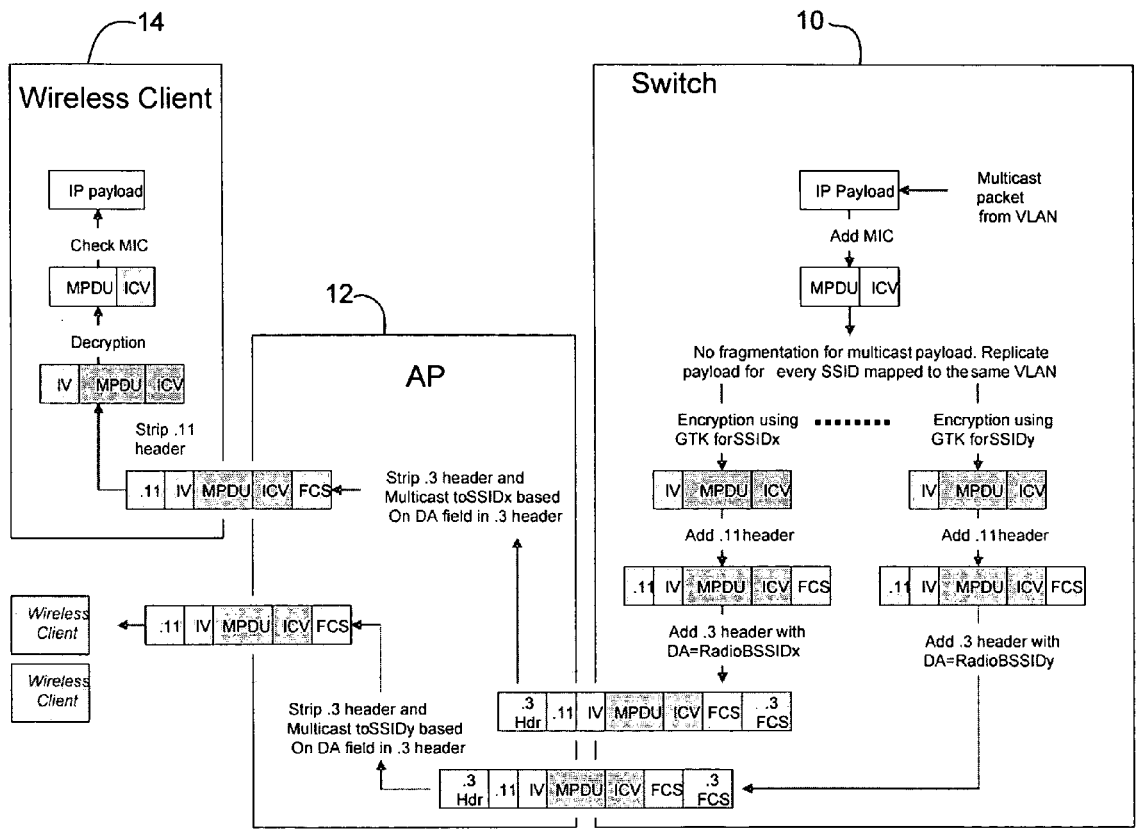
FIG. 4 illustrates downstream multicast or broadcast packet fragmentation and reassembly according to one embodiment.

FIG. 4 illustrates downstream multicast flow in accordance with one embodiment for data path encapsulation between the AP 12 and switch 10. A multicast packet is received from a VLAN (Virtual Local Area Network) and a MIC (Message Integrity Code) is added. There is no fragmentation for multicast payload. Payload is replicated for every SSID (Service Set Identifier) mapped to the same VLAN. Data is encrypted and the IEEE 802.11 and 802.3 headers are added.

Upon receiving the frame from the switch 10, the AP 12 strips the IEEE 802.3 header and sends the multicast data to the wireless client 14 based on the destination address in the IEEE 802.3 header. The wireless client 14 strips the IEEE 802.11 header and decrypts the data.

Figure 5:
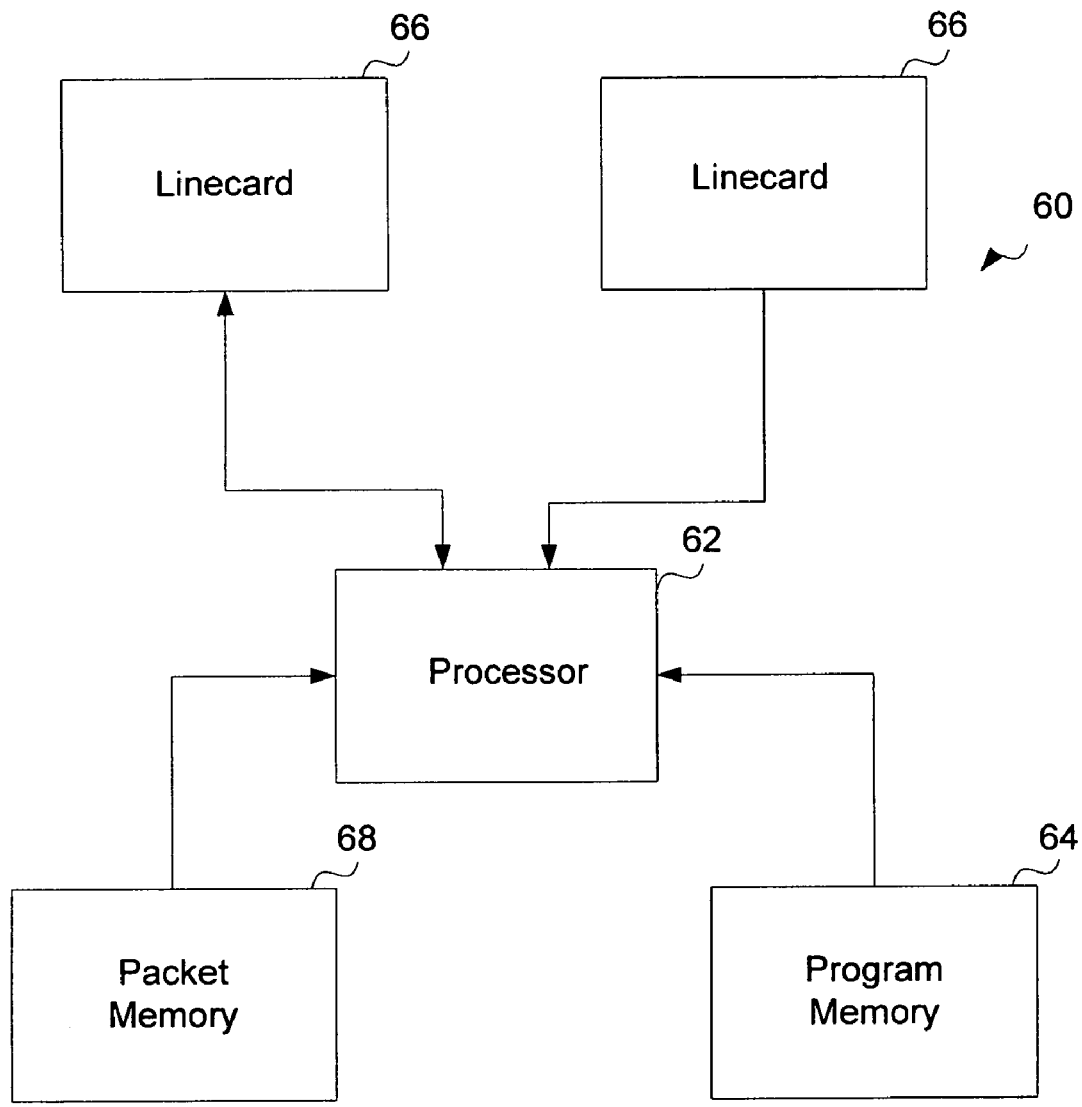
FIG. 5 depicts an example of a network device useful in implementing embodiments described herein.

FIG. 5 depicts a network device 60 that may be used to implement embodiments described herein. In one embodiment, network device 60 is a programmable machine that may be implemented in hardware, software, or any combination thereof. A processor 62 executes codes stored in a program memory 64. Program memory 64 is one example of a computer-readable medium. Program memory 64 can be a volatile memory. Another form of computer-readable medium storing the same codes would be some type of non-volatile storage such as floppy disks, CD-ROMs, DVD-ROMs, hard disks, flash memory, etc. A carrier wave that carries the code across the network is an example of a transmission medium.

Network device 60 interfaces with physical media via a plurality of linecards 66. Linecards 66 may incorporate Ethernet interfaces, DSL interfaces, Gigabit Ethernet interfaces, 10-Gigabit Ethernet interfaces, SONET interfaces, etc. As packets are received, processed, and forwarded by network device 60, they may be stored in a packet memory 68. To implement functionality according to the system, linecards 66 may incorporate processing and memory resources similar to those discussed above in connection with the network device as a whole.

As can be observed from the foregoing, the embodiments described herein have many advantages. For example, the AP is not required to do any cryptographic functions (e.g., encryption, decryption, message integrity verification, key generation, etc), thereby reducing the cost, complexity and power requirements of the AP. The AP also does not need to retain any of the per wireless station cryptographic key information.

Although the method and system have been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method for processing encrypted wireless station data at a network device in communication with an access point over a wired network, said wireless station data transmitted from a wireless station to the access point over a wireless network, the method comprising:
   receiving from the access point, a concatenated frame comprising a plurality of encrypted protocol data units associated with said wireless station data and assembled at the access point and an offset header identifying the start of each of said encrypted protocol data units;
   separating said concatenated frame into said plurality of encrypted protocol data units using said offset header;
   decrypting said encrypted protocol data units at the network device; and
   forwarding said wireless station data over the wired network.

2. The method of claim 1 further comprising removing an Ethernet header and a wireless header from said received frames.

3. The method of claim 1 wherein said offset header comprises an offset table specifying an offset for each of said plurality of encrypted protocol data units.

4. The method of claim 1 wherein said concatenated frame further comprises a start frame identifying a start of a wireless station data frame sequence and an end frame identifying an end of said wireless station data frame sequence.

5. The method of claim 1 further comprising assembling said decrypted protocol data units into a MAC service data unit and wherein forwarding wireless station data comprises forwarding said MAC service data unit.

6. The method of claim 1 wherein said received frames comprise an integrity check value field.

7. An apparatus for processing encrypted wireless station data at a network device in communication with an access point over a wired network, said wireless station data transmitted from a wireless station to the access point over a wireless network, the method comprising:
   a processor configured for:
      receiving from an access point, a concatenated frame comprising a plurality of encrypted protocol data units associated with said wireless station data and assembled at the access point and an offset header identifying the start of each of said encrypted protocol data units;
      separating said concatenated frame into said plurality of encrypted protocol data units using said offset header;
      decrypting said encrypted protocol data units; and
      forwarding said wireless station data over the wired network; and
   memory for storing encryption keys.

8. The apparatus of claim 7 wherein the encryption keys are wired equivalent privacy shared keys.

9. The apparatus of claim 7 wherein the processor is configured to assemble said decrypted protocol data units into a MAC service data unit and forward said MAC service data unit.

10. The apparatus of claim 7 wherein said concatenated frame comprises a start frame identifying a start of a wireless station data frame sequence and an end frame identifying an end of said wireless station data frame sequence.

11. A method for transmitting encrypted multicast data for a wireless client to an access point in communication with the wireless client, the method comprising:
   receiving at a network device, multicast data from a virtual local area network;
   replicating at the network device, said multicast data for wireless clients in a wireless local area network mapped to the virtual local area network;
   encrypting said multicast data at the network device;
   encapsulating said encrypted multicast data in a wireless frame;
   encapsulating said wireless frame in an Ethernet frame; and
   transmitting said encrypted multicast data from the network device to the access point over a wired network, for forwarding from the access point to the wireless clients in an encrypted form.

12. A method for processing encrypted wireless station data at an access point without decrypting said data, the method comprising:
   receiving at the access point from a wireless station, a plurality of frames comprising wireless station data fragmented into a plurality of encrypted protocol data units;
   reassembling said encrypted protocol data units at the access point; and
   forwarding said encrypted protocol data units in a concatenated frame comprising said reassembled encrypted protocol data units and an offset header identifying the start of each of said encrypted protocol data units, from the access point to a network device.

13. The method of claim 12 wherein reassembling said encrypted protocol data units comprises generating a start frame identifying a start of a wireless station data frame sequence, a plurality of frames each comprising an encrypted protocol data unit, and an end frame identifying an end of said wireless station data frame sequence.

14. The method of claim 12 further comprising maintaining a timer for receiving said plurality of encrypted protocol data units associated with a MAC service protocol data unit or MAC management data protocol unit.

15. The apparatus of claim 7 wherein the processor is further configured for removing an Ethernet header and a wireless header from said received frames.

16. The apparatus of claim 7 wherein said offset header comprises an offset table specifying an offset for each of said plurality of encrypted protocol data units.

* * * * *